United States Patent
Di Perna et al.

(10) Patent No.: US 10,138,777 B2
(45) Date of Patent: Nov. 27, 2018

(54) APPARATUS AND METHODS FOR EVALUATING A SOOT QUANTITY ACCUMULATED IN A SELECTIVE CATALYTIC REDUCTION WASHCOATED PARTICULATE FILTER

(71) Applicant: GM GLOBAL TECHNOLOGY OPERATIONS LLC, Detroit, MI (US)

(72) Inventors: Luciano Nunziato Di Perna, Lake Orion, MI (US); Stefano Pellegrino, Troy, MI (US); Isadora Ricci, Turin (IT)

( * ) Notice: Subject to any disclaimer, the term of this patent is extended or adjusted under 35 U.S.C. 154(b) by 215 days.

(21) Appl. No.: 15/247,323

(22) Filed: Aug. 25, 2016

(65) Prior Publication Data

US 2018/0058284 A1   Mar. 1, 2018

(51) Int. Cl.
*F01N 3/023* (2006.01)
*F01N 3/035* (2006.01)
(Continued)

(52) U.S. Cl.
CPC .............. *F01N 3/035* (2013.01); *F01N 3/00* (2013.01); *F01N 3/021* (2013.01); *F01N 3/023* (2013.01); *F01N 3/208* (2013.01); *F01N 9/002* (2013.01); *F01N 2560/026* (2013.01); *F01N 2610/02* (2013.01); *F01N 2900/1402* (2013.01); *F01N 2900/1411* (2013.01); *F01N 2900/1602* (2013.01); *F01N 2900/1606* (2013.01); *F01N 2900/1614* (2013.01);
(Continued)

(58) Field of Classification Search
CPC .......... F01N 3/035; F01N 3/023; F01N 3/208; F01N 2610/02; F01N 3/021; F01N 9/002; F01N 2560/026; F01N 2900/1402; F01N 2900/1411; F01N 2900/1602; F01N 2900/1606; F01N 2900/1614; F01N 2900/1812; Y02T 10/24; Y02T 10/47

See application file for complete search history.

(56) References Cited

U.S. PATENT DOCUMENTS

2015/0047328 A1* 2/2015 Larose, Jr. .............. F01N 3/035
60/297

OTHER PUBLICATIONS

U.S. Appl. No. 15/059,654, filed Mar. 3, 2016, Titled: Method of Evaluating a Soot Quantity Accumulated in a Selective Catalytic Reduction Washcoated Particulate Filer (SDPF), Patentee: GM Global Technology Operations LLC.

* cited by examiner

*Primary Examiner* — Brandon Lee

(57) ABSTRACT

Methods for evaluating a soot quantity accumulated in a selective catalytic reduction wash-coated particulate filter (SCRF) of an exhaust gas treatment system are provided, and include injecting reductant proximate the SCRF, determining one or more mapping values, computing a correction value of a soot quantity using a map correlating the one or more mapping values, detecting an apparent soot burning operating temperature, and correcting an estimated value of the soot quantity using the correction value in order to obtain an evaluated value of the soot quantity. The one or more mapping values can include a reductant injection quantity value, a NOx quantity value, a temperature value, and a mass flow value of an exhaust gas. The apparent soot burning operating temperature can comprise a temperature at which a ΔP across the SCRF improperly implies an actual soot burning. Further provided are apparatuses for performing the disclosed methods.

18 Claims, 4 Drawing Sheets

(51) Int. Cl.
*F01N 3/20* (2006.01)
*F01N 3/021* (2006.01)
*F01N 9/00* (2006.01)
*F01N 3/00* (2006.01)

(52) U.S. Cl.
CPC ....... *F01N 2900/1812* (2013.01); *Y02T 10/24* (2013.01); *Y02T 10/47* (2013.01)

APPARATUS AND METHODS FOR EVALUATING A SOOT QUANTITY ACCUMULATED IN A SELECTIVE CATALYTIC REDUCTION WASHCOATED PARTICULATE FILTER

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons and oxides of nitrogen ($NO_x$), and oxides of sulfur (SOx), as well as condensed phase materials (liquids and solids) that constitute particulate matter (e.g., soot). Exhaust gas treatment systems are often employed to reduce $NO_x$ emissions from exhaust gas streams. Exhaust gas treatment systems can employ one or more components configured for accomplishing an after-treatment process such as reducing and/or removing pollutants from the exhaust gas before discharging it in the environment.

Generally, treatment systems can include an Oxidation Catalyst, such as a Diesel Oxidation Catalyst, for oxidizing hydrocarbon (HC) and carbon monoxides (CO) into carbon dioxide ($CO_2$) and water ($H_2O$), and a Diesel Particulate Filter (DPF), located in the exhaust gas pipe downstream the DOC for removing diesel particulate matter or soot from the exhaust gas. In order to reduce NOx emissions, most treatment systems further include a Selective Reduction Catalyst (SCR) device, which is located in the exhaust gas pipe downstream and/or upstream of the DPF.

The SCR is a catalytic device in which the nitrogen oxides ($NO_x$) contained in the exhaust gas are reduced into diatomic nitrogen ($N_2$) and water ($H_2O$), with the aid of a gaseous reducing agent, typically ammonia ($NH_3$), that is absorbed inside the catalyst. The ammonia is obtained through thermo-hydrolysis of a Diesel Exhaust Fluid (DEF), typically urea ($CO(NH_2)_2$), that is injected into the exhaust gas pipe through a dedicated injector located between the DPF and the SCR.

More recently, Selective Catalytic Reduction wash-coated particulate filters (also referred to as SCRFs) have been introduced in the treatment system architecture. A SCRF is an SCR catalyst coated on a porous DPF. During operation of both DPFs and SCRFs, soot can accumulate and impair device operation. Monitoring accumulated soot in various treatment devices remains a challenge.

SUMMARY

According to an aspect of an exemplary embodiment, a method for evaluating a soot quantity accumulated in a selective catalytic reduction wash-coated particulate filter (SCRF) of an exhaust gas treatment system is provided. The method can include injecting reductant proximate the SCRF via a reductant injector, determining one or more mapping values, computing a correction value of a soot quantity using a map correlating the one or more mapping values, detecting an apparent soot burning operating temperature, and correcting an estimated value of the soot quantity using the correction value in order to obtain an evaluated value of the soot quantity. The one or more mapping values can include a reductant injection quantity value to be injected by the reductant injector, a NOx quantity value at an inlet of the selective catalytic reduction washcoated particulate filter, a temperature value at the inlet of the selective catalytic reduction washcoated particulate filter, and a mass flow value of an exhaust gas. The apparent soot burning operating temperature can comprise a temperature at which a ΔP across the SCRF improperly implies an actual soot burning.

According to an aspect of an exemplary embodiment, an apparatus for evaluating a soot quantity accumulated in a selective catalytic reduction wash-coated particulate filter (SCRF) comprises an exhaust gas treatment system including a SCRF and a reductant injector configured to inject reductant proximate the SCRF, and an electronic control unit for controlling the reductant injector. The electronic control unit can be configured to determine one or more mapping values, determine a correction value of the soot quantity using the one or more mapping values, detect an apparent soot burning operating temperature; and correct an estimated value of the soot quantity using the correction value in order to obtain an evaluated value of the soot quantity. The one or more mapping values can include a reductant injection quantity value to be injected by the reductant injector, a NOx quantity value at an inlet of the selective catalytic reduction washcoated particulate filter, a temperature value at the inlet of the selective catalytic reduction washcoated particulate filter, and a mass flow value of an exhaust gas. The apparent soot burning operating temperature can comprise a temperature at which a ΔP across the SCRF improperly implies an actual soot burning. The apparatus can further include an internal combustion engine for providing an exhaust gas stream to the exhaust gas treatment system.

The exhaust gas of the above methods and apparatuses can include $NO_x$ species. The exhaust gas treatment systems of the above methods and apparatuses can be used to treat the exhaust gas of an internal combustion engine (ICE). The ICE can comprise a diesel engine. The reductant can comprise urea. The estimated value of the soot quantity can be determined using a pressure difference between the inlet and an outlet of the SCRF.

Although many of the embodiments herein are describe in relation to ICE exhaust gas treatment utilizing SCRFs, the embodiments herein are generally suitable for treatment of exhaust gases from all sources which contain $NO_x$ species.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
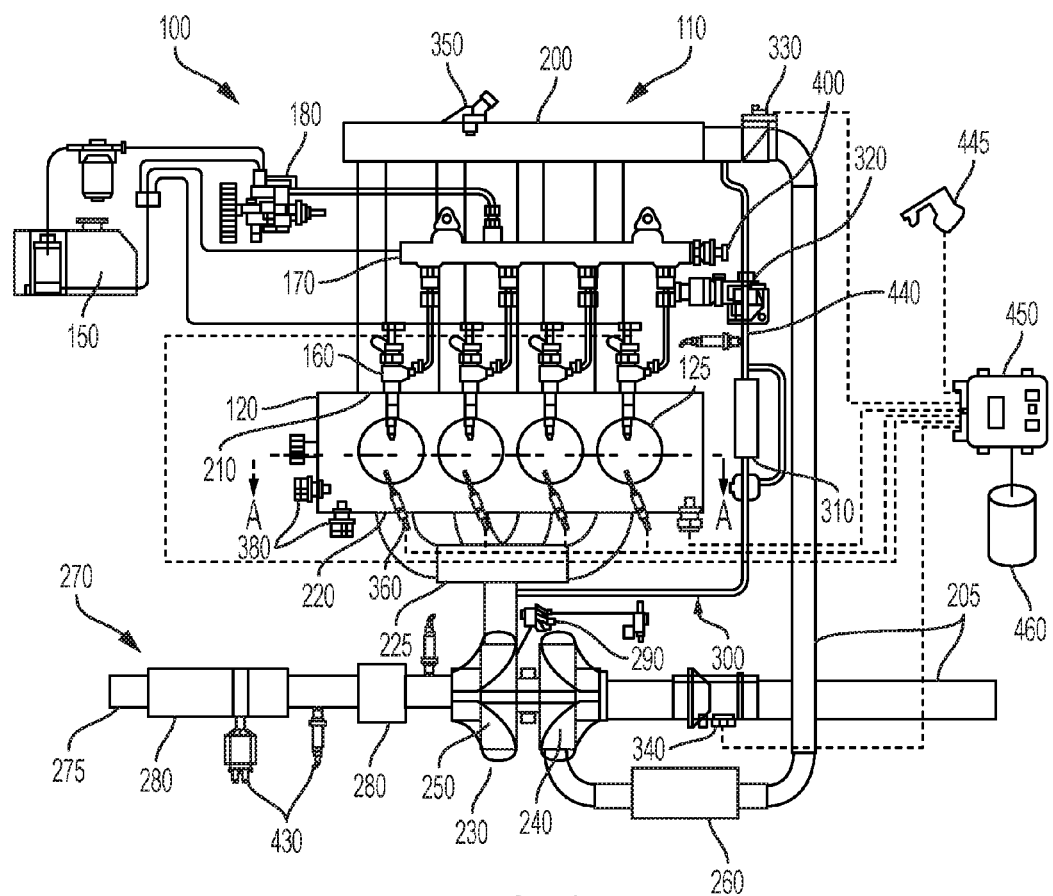
FIG. 1 illustrates an automotive system, according to one or more embodiments
Figure 2:
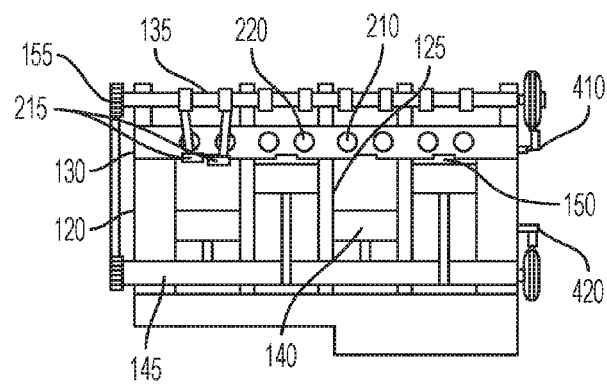
FIG. 2 illustrates a cross-section of an internal combustion engine belonging to the automotive system of FIG. 1, according to one or more embodiments

Some embodiments can include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 can selectively vary the timing between the camshaft 135 and the crankshaft 145.

The air can be distributed to the air intake port(s) 210 through an intake manifold 200. An air intake duct 205 can provide air from the ambient environment to the intake manifold 200. In other embodiments, a throttle body 330 can be provided to regulate the flow of air into the manifold 200. In still other embodiments, a forced air system such as a turbocharger 230, having a compressor 240 rotationally coupled to a turbine 250, can be provided. Rotation of the compressor 240 increases the pressure and temperature of the air in the duct 205 and manifold 200. An intercooler 260 disposed in the duct 205 can reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 can be fixed geometry and/or include a waste gate. It should be appreciated that all embodiments herein are not limited by the particular engine characteristics as shown in FIG. 1, and, rather, are generally applicable to all ICEs.

The exhaust gas treatment system 270 can include an exhaust pipe 275 having one or more exhaust treatment devices 280. The treatment devices can be any device configured to change the composition of the exhaust gases. Changing exhaust gas composition can include chemically modifying some or all exhaust gas species (e.g., $NO_x$ species), and removing exhaust gas species (e.g., soot), for example. Exhaust gas can comprise $NO_x$ species. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

Some examples of treatment devices 280 include, but are not limited to, catalytic converters (two and three way), oxidation catalysts, lean $NO_x$ traps, hydrocarbon adsorbers, selective catalytic reduction (SCR) systems, particulate filters, and/or selective catalytic reduction wash-coated particulate filters (SCRFs). Other embodiments can include an exhaust gas recirculation (EGR) system 300 coupled between the exhaust manifold 225 and the intake manifold 200. The EGR system 300 can include an EGR cooler 310 to reduce the temperature of the exhaust gases in the EGR system 300. An EGR valve 320 regulates a flow of exhaust gases in the EGR system 300.

The automotive system 100 can further include an electronic control unit (ECU) 450 in communication with one or more sensors and/or devices associated with the ICE 110. The ECU 450 can receive input signals from various sensors configured to generate the signals in proportion to various physical parameters associated with the ICE 110. The sensors can include, but are not limited to, one or more of a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 can generate output signals to various control devices that are arranged to control the operation of the ICE 110, including, but not limited to, the fuel injectors 160, the throttle body 330, the EGR Valve 320, the VGT actuator 290, and the cam phaser 155. For example, in exhaust gas treatment system 270, a $NO_x$ sensor can be utilized to measure one or more $NO_x$ concentration values in the exhaust gas. The $NO_x$ values measured can be sent to the ECU 450 in order to calculate the quantity of reductant to be injected in the exhaust gas pipe for achieving an adequate $NO_x$ reduction inside the SCR portion of an SCRF.

Figure 3:
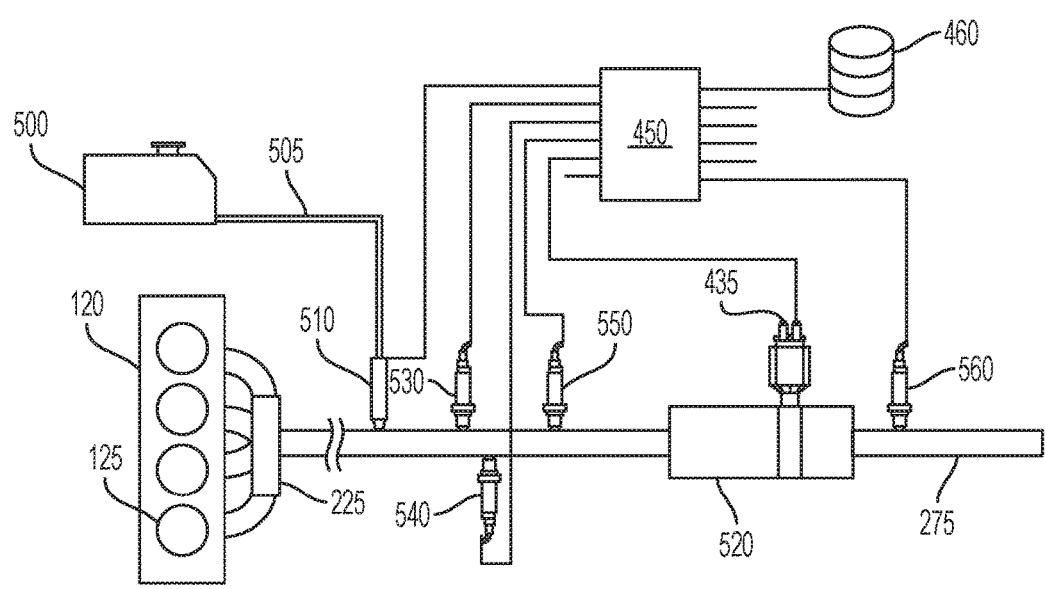
FIG. 3 illustrates a schematic view of a portion of an treatment system for an internal combustion engine, according to one or more embodiments.

Turning now to the ECU 450, this apparatus can include a digital central processing unit (CPU) in communication with a memory system, or data carrier 460, and an interface bus. The CPU is configured to execute instructions stored as a program in the memory system, and send and receive signals to/from the interface bus. The memory system can include various storage types including optical storage, magnetic storage, solid state storage, and other non-volatile memory. The interface bus can be configured to send, receive, and modulate analog and/or digital signals to/from the various sensors and control devices. The program can embody the methods disclosed herein, allowing the CPU to carry out the steps of such methods and control the ICE 110. In FIGS. 1-3, dashed lines are used to indicate communication between the ECU 450 and the various sensors and devices, but some are omitted for clarity.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 can have a different type of processor to provide the electronic logic, e.g. an embedded controller, an onboard computer, or any processing module that might be deployed in an automotive vehicle.

FIG. 3 illustrates a schematic view of a portion of the exhaust gas treatment system 270 for an ICE 110. In the embodiment depicted in FIG. 3, the exhaust gas treatment system 270 includes a SCRF 520. Generally, SCRF 520 comprises a DPF filter wash-coated with a Selective Catalytic Reduction (SCR) element. The SCR element is generally a porous and high surface area material which can operate efficiently to convert (i.e., reduce) $NO_x$ constituents in the exhaust gas in the presence of a reductant. For example, the catalyst composition can contain one or more of a ceramic, zeolite, one or more base metal components such as iron (Fe), cobalt (Co), copper (Cu) or vanadium (V), sodium (Na), barium (Ba), titanium (Ti), tungsten (W), copper (Cu), and platinum group metals. In some embodiments the ceramic can include as extruded cordierite, α-alumina, silicon carbide, silicon nitride, zirconia, mullite, spodumene, alumina-silica-magnesia, zirconium silicate, sillimanite, and petalite. In some embodiments the zeolite can include a β-type zeolite, a Y-type zeolite, a ZM5 zeolite, or any other crystalline zeolite structure such as a Chabazite or a USY (ultra-stable Y-type) zeolite. Suitable platinum group metals include Pt, Pd, Rh, Ru, Os or Ir, or combinations thereof, including alloys thereof.

The SCR portion in the SCRF 520 reduces the nitrogen oxides ($NO_x$) contained in the exhaust gas into diatomic nitrogen ($N_2$) and water ($H_2O$). The SCRF 520 is associated with a reductant injector 510, which is located in the exhaust pipe 275 upstream of the SCRF 520 for injecting reductant into the exhaust gas stream. Due to thermo-hydrolysis reactions occurring inside the exhaust pipe 275, reductant is converted into a gaseous reducing agent, typically ammonia (NH3), which is absorbed inside the SCR portion of the SCRF 520, so as to promote NOx reduction reactions.

In some embodiments, reductant can comprise ammonia ($NH_3$), such as anhydrous ammonia or aqueous ammonia. In some embodiments, reductant can comprise any composition capable of decomposing into $NH_3$ in the presence of exhaust gas. For example reductant can be generated from a nitrogen and hydrogen rich substance such as urea (CO($NH_2)_2$). Non-ammonia reductants can be used as a full or partial alternative to ammonia as desired. In some embodiments, reductant can be diluted with water. In some embodiments, reductant can comprise diesel exhaust fluid (I) T), A particular formulation for DEF can comprise an aqueous urea solution made with 32.5% urea and 67.5% deionized water.

Reductant is contained in a reductant tank 500 and reaches the reductant injector 510 through a reductant pipe 505. The injections of reductant are commanded by the ECU 450, according to engine operating conditions or other parameters. Upstream of the SCRF 520 a $NO_x$ quantity sensor 530 and a temperature sensor 540 are provided, for example, in the exhaust pipe 275. Furthermore, an exhaust mass flow sensor 435 is also provided in the exhaust pipe 275.

During use of the SCRF 520, soot accumulates within the DPF portion. The quantity of soot accumulated within the DPF portion of the SCRF 520 can be estimated as a function of pressure drop (ΔP) across the SCRF 520. Therefore a physical soot model can be created utilizing a differential pressure between the inlet and the outlet of the DPF, and the physical characteristics of the DPF portion of the DPF. As shown in FIG. 3, an upstream pressure sensor 550 is provided upstream of the SCRF 520 and a downstream pressure sensor 560 is provided downstream thereof, in such a way that the pressure values read by the pressure sensors 550 and 560 can be communicated to the ECU 450 for the calculation of a differential pressure across the SCRF 520. Based on such differential pressure, the ECU 450 can calculate an estimated value (e.g., mass) of the soot quantity accumulated in the SCRF employing the physical soot model.

The physical soot model assumes a strict correlation between the pressure drop through the SCRF 520 and the accumulated soot. However, this correlation is altered by the CRT (Continuously Regenerating Trap) effect which refers to the reduction of $NO_2$ in the presence of soot as shown in Equation (1).

$$NO_2 + C \rightarrow CO + NO \qquad (1)$$

As the $NO_2$:$NO_x$ ratio decreases, a regeneration (i.e., soot burning) occurs which causes a pressure drop across the SCRF. The occurrence of this phenomenon is dependent upon factors such as local temperature, the $NO_2$:$NO_x$ ratio, and degree of soot loading within the SCRF.

Figure 4:
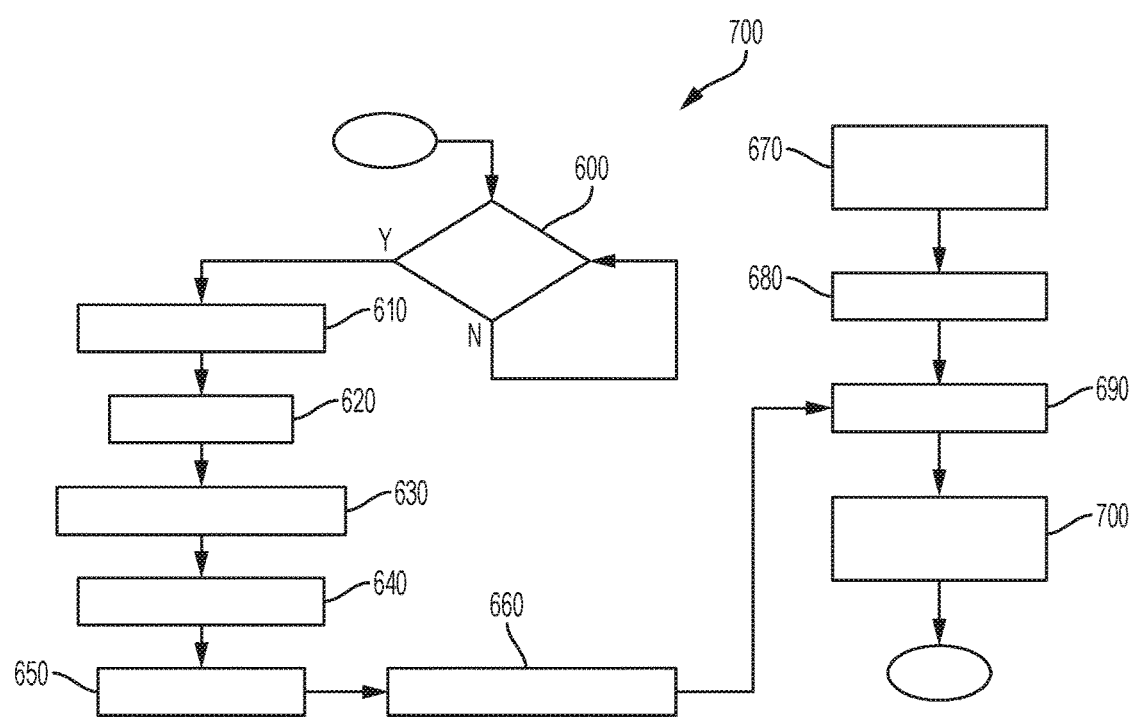
FIG. 4 illustrates a flowchart describing a method for estimating soot accumulation, according to one or more embodiments.

During the use of the automotive vehicle, a soot quantity accumulated into the SCRF 520 is estimated using a known physical model. FIG. 4 illustrates a flowchart depicting a CRT effect correction method 700 for correcting a soot accumulation estimation model in the SCRF 520 during reductant injection proximate the SCRF 520. Reductant injection proximate the SCRF 520 can comprise injecting reductant into the SCRF, and/or injecting reductant upstream of the SCRF 520. In particular, in the known physical model, a pressure difference 670 across the SCRF 520 is measured, for example by employing the upstream pressure sensor 550 (upstream of the SCRF 520) and the downstream pressure sensor 560 (downstream of the SCRF 520). This pressure difference 670 is used by the ECU 450 as input of the physical model 680 in order to calculate an estimated soot value (SQest) 690 of the soot quantity trapped into the SCRF 520.

During use of the automotive vehicle, the ECU 450 monitors the necessity of performing a reductant injection 600 upstream of the SCRF 520. In case no reductant injection 600 is performed, the SQest value 690 can be taken as a correct evaluation of the soot quantity accumulated in the SCRF 520. In an alternative, in the same case in which no reductant injection 600 is performed, a known further model can be employed to correct the SQest value 690 by means of the first known physical model.

However, according to an embodiment of the present disclosure, if a reductant injection 600 is performed, a correction value (SQcorr) 660 of the soot quantity is calculated, taking into account also the value of a reductant quantity (R_inj) 610 to be injected by the reductant injector 510. R_inj value 610 can comprise the reductant quantity of the previous reductant injection, the reductant quantity of the current reductant injection, or the determined reductant quantity of a planned (i.e., future) reductant injection. In particular, the ECU 450 determines the R_inj value 610 and memorizes such value in the data carrier 460 from which it can be used in the various embodiments of the method.

Additionally, a $NO_x$ quantity value (Inlet_$NO_x$) 620 at the inlet of the SCRF 520 is determined, for example by reading the measurement of the NOx quantity sensor 530 upstream of the SCRF 520. Additionally, a temperature value (Inlet_temp) 630 at the inlet of the SCRF is determined, for example by reading the measurement of the temperature sensor 540 upstream of the SCRF 520. Also, an exhaust mass flow value (EMF) 640 of the exhaust gas in the exhaust line 275 is determined, for example by reading the measurement of the mass flow sensor 435. No order should be imposed for determining the R_inj value 610, the Inlet_$NO_x$ value 620, the Inlet_temp value 630, or EMF value 640. In some embodiments, method 700 comprises determining only one of the R_inj value 610, the Inlet_ $NO_x$ value 620, the Inlet_temp value 630, or EMF value 640. In some embodiments, method 700 comprises determining at least one of the R_inj value 610, the Inlet_$NO_x$ value 620, the inlet_temp value 630, or EMF value 640. In some embodiments, method 700 comprises determining a plurality of the R_inj value 610, the Inlet_$NO_x$ value 620, the Inlet_temp value 630, and EMF value 640. In some embodiments, method 700 comprises determining each of the R_inj value 610, the Inlet_$NO_x$ value 620, the temp value 630, and EMF value 640. In methods wherein a plurality of the R_inj value 610, the Inlet_$NO_x$ value 620, the Inlet_temp value 630, and the EMF value 640 are determined, no order should be imposed for determining the R_inj value 610, the Inlet_$NO_x$ value 620, the Inlet_temp value 630, and EMF value 640. The R_inj value 610, the Inlet_$NO_x$ value 620, the Inlet_temp value 630, and the EMF value 640 can each or collectively be referred to as mapping values.

Then a correction map 650 correlates the R_inj value 610, the Inlet_$NO_x$ value 620, the Inlet_temp value 630, and the EMF value 640 in order to calculate the SQcorr value 660 of the soot quantity. The correction map 650 can be pre-calibrated and stored in the data carrier 460, for example. Finally, the SQest value 690 of the soot quantity is corrected, using the SQcorr value 660, in order to obtain an evaluated value (SQeval) 700 of the soot quantity. In general, the SQeval value 700 is lower than the SQest value 690 to reflect the reduced soot load as a result of the CRT effect.

According to another embodiment of the present disclosure, the map is subdivided two sub maps, where in a first sub-map correlates the R_inj value 610 and the Inlet_$NO_x$ value 620 to an intermediate value SQint of the soot quantity, and a second sub-map correlates the intermediate value SQint, the Inlet_temp value 630 and the ENT value 640 to a correction value SQcorr of the soot quantity. The two sub maps can be pre-calibrated and stored in the data carrier 460, for example.

The above subdivision of the map is not the only possible subdivision, since many other possibilities can be envisaged of organizing the required data to determine the SQcorr value 660 of the soot quantity, starting from the R_inj value 610, the Inlet_$NO_x$ value 620 and the Inlet_temp value 630 at the inlet of the SCRF 520, and the EMF value 640 depending on hardware and/or software requirements.

The map correlating the R_inj value 610, the Inlet_$NO_x$ value 620 and the Inlet_temp value 630, and the EMF value 640 with the SQcorr value 660 can be determined by means of an experimental activity and then stored in the data carrier 460 associated to the ECU 450.

However, for certain temperature ranges (Apparent_Temp) during reductant injection, a ΔP across the SCRF 520 improperly implies an actual soot burning where no soot burning or minimal soot burning actually occurs. Over such temperature ranges, method 700 will therefore incorrectly estimate soot accumulation the SCRF 520. In particular, in some embodiments, method 700 will underestimate soot accumulation the SCRF 520 over certain temperature ranges.

Figure 5:
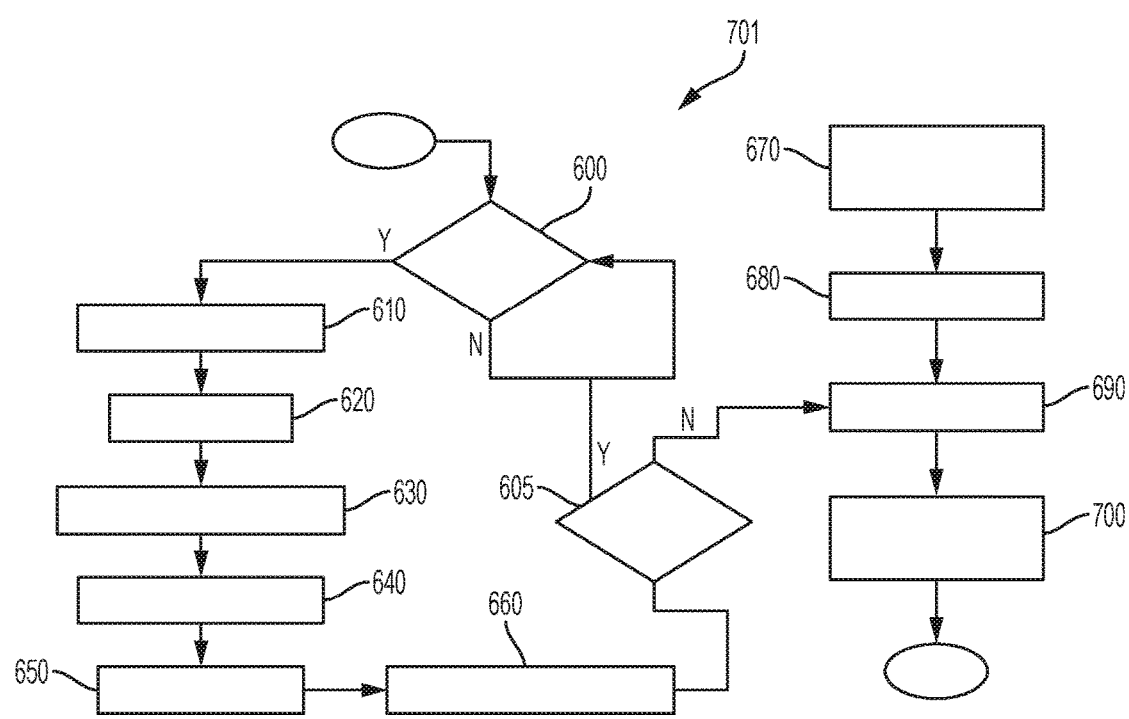
FIG. 5 illustrates a flowchart describing a method for estimating soot accumulation, according to one or more embodiments.

FIG. 5 illustrates a flowchart depicting a method 701 for estimating soot accumulation in the SCRF 520 which corrects for apparent soot burning during reductant injection. Method 701 comprises method 700, and additionally includes determining if reductant injection occurs at an Apparent_Temp 605. If reductant injection occurs at an Apparent_Temp 605, the SQest value 690 is not corrected to yield the SQeval value 700. If reductant injection does not occur at an Apparent_Temp 605, the SQest value 690 is corrected to yield the SQeval value 700. While FIG. 4 illustrates Apparent_Temp 605 in a particular position within the flow chart, Apparent_Temp 605 can be determined at any point after reductant injection 600 and before the SQeval value 700 is determined.

Apparent_Temp 605 can be an upper temperature limit, a lower temperature limit, or a temperature range. For example, an SCRF 520 can operate at temperatures from −25° C. (e.g., at cold ambient conditions and/or at ICE 110 startup) to 800° C., and sometimes higher, and reductant injection can occur at about 180° C. up to the maximum SCRF 520 operating temperature. In some embodiments, a ΔP across the SCRF 520 can improperly imply an actual soot burning for an Apparent_Temp over about 275° C., over about 295° C., or over about 300° C. In some embodiments, a ΔP across the SCRF 520 can improperly imply an actual soot burning for an Apparent_Temp under about 525° C., over about 505° C., or over about 500° C. In some embodiments, a ΔP across the SCRF 520 can improperly imply an actual soot burning for an Apparent_Temp range of about 275° C. to about 525° C., about 295° C. to about 505° C., or about 300° C. to about 500° C.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes can be made in the function and arrangement of elements described in an exemplary embodiment without departing from the scope of the invention as set forth in the appended claims and their legal equivalents.

What is claimed is:

1. A method of evaluating a soot quantity accumulated in a selective catalytic reduction wash-coated particulate filter (SCRF) of an exhaust gas treatment system, the method comprising:
injecting reductant proximate the SCRF via a reductant injector;
determining one or more of a reductant injection quantity value to be injected by the reductant injector, a NOx quantity value at an inlet of the selective catalytic reduction wash coated particulate filter, a temperature value at the inlet of the selective catalytic reduction wash coated particulate filter, and a mass flow value of an exhaust gas;
computing a correction value of a soot quantity using a map correlating the one or more determined reductant quantity value, the NOx quantity value, the temperature value, and the mass flow value;
detecting an apparent soot burning operating temperature; and
correcting an estimated value of the soot quantity using the correction value in order to obtain an evaluated value of the soot quantity when the step of injecting reductant does not occur at the apparent soot burning operating temperature;
wherein the apparent soot burning operating temperature comprises a temperature at which a pressure difference ($\Delta P$) across the SCRF improperly implies an actual soot burning.

2. The method of claim 1, wherein the apparent soot burning operating temperature comprises at least 275° C.

3. The method of claim 1, wherein the apparent soot burning operating temperature comprises less than 525° C.

4. The method of claim 1 wherein the apparent soot burning operating temperature comprises 275° C. to 525° C.

5. The method of claim 1, wherein the SCRF includes a selective catalytic reduction element.

6. The method of claim 1, wherein the reductant comprises urea.

7. The method of claim 1, further comprising determining each of the reductant injection quantity value to be injected by the reductant injector, the NOx quantity value at an inlet of the selective catalytic reduction washcoated particulate filter, the temperature value at the inlet of the selective catalytic reduction washcoated particulate filter, and the mass flow value of an exhaust gas in the treatment system.

8. The method of claim 7, further comprising subdividing the map into a first sub-map correlating the reductant quantity value and the NOx quantity value to an intermediate value, and a second sub-map correlating the intermediate value, the temperature value and the mass flow value to the correction value.

9. The method of claim 1, further comprising determining the estimated value using a pressure difference between the inlet and an outlet of the SCRF.

10. The method according to claim 1, further comprising determining the reductant quantity value in an electronic control unit.

11. The method according to claim 1, further comprising determining the NOx quantity value at the inlet of the selective catalytic reduction wash-coated particulate filter using a NOx quantity sensor located upstream of the selective catalytic reduction wash-coated particulate filter.

12. The method according to claim 1, further comprising determining the temperature value at the inlet of the selective catalytic reduction wash-coated particulate filter using a temperature sensor located upstream of the selective catalytic reduction wash-coated particulate filter.

13. The method according to claim 1, further comprising determining the mass flow value (EMF) using a mass flow sensor located in the exhaust gas treatment system.

14. The method of claim 1, further comprising a computer program comprising a computer-code stored in a non-transitory computer-readable media.

15. An apparatus for evaluating a soot quantity accumulated in a selective catalytic reduction wash-coated particulate filter (SCRF), the apparatus comprising:
an exhaust gas treatment system including the SCRF and a reductant injector configured to inject reductant proximate the SCRF;
an electronic control unit for controlling the reductant injector and configured to:
inject the reductant via the reductant injector;
determine one or more of a reductant injection quantity value to be injected by the reductant injector, a NOx quantity value at an inlet, of the selective catalytic reduction washcoated particulate filter, a temperature value at the inlet of the selective catalytic reduction washcoated particulate filter, and a mass flow value of an exhaust gas;
determine a correction value of the soot quantity using a map correlating one or more of the reductant quantity value, the NOx quantity value, the temperature value and the exhaust mass flow value;
detect an apparent soot burning operating temperature, and
correct an estimated value of the soot quantity using the correction value in order to obtain an evaluated value of the soot quantity when the reductant injection does not occur at the apparent soot burning operating temperature;
wherein the apparent soot burning operating temperature comprises a temperature at which a pressure difference ($\Delta P$) across the SCRF improperly implies an actual soot burning.

16. The apparatus of claim 15, further comprising an internal combustion engine for providing an exhaust gas stream to the exhaust gas treatment system.

17. The apparatus of claim 15, wherein the SCRF comprises a selective catalytic reduction element.

18. The apparatus of claim 15, wherein the apparent soot burning operating temperature comprises 275° C. to 525° C.

* * * * *